United States Patent
Boldy et al.

(10) Patent No.: US 6,765,502 B2
(45) Date of Patent: Jul. 20, 2004

(54) ERGONOMIC KEYBOARD DEVICE

(75) Inventors: Manfred Boldy, Horb (DE); Werner Ruppert, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 488 days.

(21) Appl. No.: 09/802,737

(22) Filed: Mar. 9, 2001

(65) Prior Publication Data

US 2001/0021332 A1 Sep. 13, 2001

(30) Foreign Application Priority Data

Mar. 10, 2000 (EP) .......................................... 00105135

(51) Int. Cl.[7] ................................................ B41J 5/10
(52) U.S. Cl. ......................... 341/22; 400/489; 341/34
(58) Field of Search ............................. 341/22, 34, 21, 341/17; 400/489, 492, 491, 494; 345/169, 781; 178/79, 81, 101, 109; 200/341, 345

(56) References Cited

U.S. PATENT DOCUMENTS

| | | | |
|---|---|---|---|
| 4,042,777 A | | 8/1977 | Bequaert et al. ............... 179/79 |
| 4,849,732 A | * | 7/1989 | Dolenc ......................... 341/20 |
| 4,913,573 A | * | 4/1990 | Retter .......................... 400/489 |
| 5,087,910 A | | 2/1992 | Guyot-Sionnest ............ 340/711 |
| 5,178,477 A | | 1/1993 | Gambaro ...................... 400/489 |
| 5,432,510 A | * | 7/1995 | Matthews ...................... 341/20 |
| 5,748,511 A | * | 5/1998 | Mansutti et al. ............. 708/109 |
| 5,764,164 A | * | 6/1998 | Cartabiano et al. ............ 341/22 |
| 5,796,354 A | * | 8/1998 | Cartabiano et al. ............ 341/22 |

* cited by examiner

Primary Examiner—Michael Horabik
Assistant Examiner—Hung Dang
(74) Attorney, Agent, or Firm—Carlos Munoz-Bustamante (57) ABSTRACT

A keyboard data input device includes a one-hand module having a finger section with groups of keys each of which fixedly assigned to a finger of the operator. The keyboard has a cover part which includes a palm rest section and grooves. A group of keys is sequentially arranged at the ground of said grooves to be reached by the outstretched or bent fingers when the operator's hand is in contact with the palm rest section. A thumb section located adjacent to the forefinger groove comprises a flat area which includes groups of command keys, and comprises further keys at an upright wall adjacent to the forefinger groove. The keyboard may be used for two-hand operation by providing two separate one-hand modules. The keyboard comprises a graphical multipurpose display visualize control information and characters typed in. The keyboard may further include a bar code scanner.

15 Claims, 10 Drawing Sheets

| 43 | 62 | 41 | |
|---|---|---|---|
| Esc | Shift-Lock | Ctl | Alt |
| Tab | Shift | Leer | Alt-Gr |

| 41 | 61 | 43 |
|---|---|---|---|
| <— | Del | Ins | R-Mouse |
| Enter | Leer | Shift | L-Mouse |

44

25

| q,Q | w,W | e,E | r,R |
|---|---|---|---|
| !," | ß,? | t,T | z,Z |
| a,A | s,S | d,D | f,F |
| y,Y | x,X | c,C | v,V |

64

25

| u,U | i,I | o,O | p,P |
|---|---|---|---|
| g,G | ü,Ü | ö,Ö | ä,Ä |
| h,H | j,J | k,K | l,L |
| b,B | n,N | m,M | , . |

63

| = | * | / | R-Mouse |
|---|---|---|---|
| Enter | + | - | L-Mouse |

66

| 7 | 8 | 9 | {,} |
|---|---|---|---|
| 4 | 5 | 6 | [,] |
| 1 | 2 | 3 | (,) |
|  | 0 | , | %,$ |

ERGONOMIC KEYBOARD DEVICE

FIELD OF THE INVENTION

The invention relates generally to an ergonomic keyboard device suitable for use as data input means to information processing systems such as computer and telephone systems, and more particularly to a keyboard device comprising one or more one-hand modules which may be connected to a computer or telephone system by a data communication channel or which may be part of a hand-held computer or mobile telephone.

BACKGROUND OF THE INVENTION

The extensive use of keyboards as preferred data input tools for information processing and communication systems such as personal computers, Internet terminals and telephone sets has initiated developments to improve the design of keyboards in order to make them better adapted to the human anatomy. Conventional flat keyboards are large and contain a plurality of keys arranged in parallel rows to which the positioning and movement of the operator's hand and fingers have to be adapted. Such keyboards require large space which may present a problem when the keyboard is used in connection with a mobile device or is part of such a device. Using such keyboards, the fingers of the operator have to cover a relatively wide range for locating and actuating the desired keys. In the daily work at the keyboard which often lasts many hours of the day, an environment as provided by conventional keyboards burdens the user, may give rise to health problems and reduces productivity.

To avoid problems of this kind, efforts have been made to develop more ergonomic keyboards. U.S. Pat. No. 4,042,777 of Bequaert et al discloses a one-hand keyboard which comprises a finger section containing ten keys and a thumb section containing four keys. This keyboard is used to enter alphanumerical characters and special characters. In the finger section two keys are assigned to each finger. The keys assigned to a finger or to the thumb are operated individually or in parallel by depressing two or more keys simultaneously. By depressing several keys at once the operator forms chords somewhat as a pianist forms chords on a piano. The keys of the thumb section are used to enter numerals, special signs such as punctuation, and commands such as lowercase and uppercase, space etc. Control circuits are used to interpret the chords and emit electrical signals which represent strings of characters implied by the chords. The effective use of this keyboard requires a well-trained operator able to actuate the plurality of keys according to the desired chords and speed.

Another known one-hand keyboard is disclosed by U.S. Pat. No. 5,087,910 of Guyot-Sionnest. This keyboard provides a sequential operation of the keys by a movement of the finger tips over the keys which have a special profile to facilitate fluent work. In this manner three states may be defined by pairs of keys assigned to each finger, and five states may be defined by four keys assigned to the thumb. Accordingly, by simultaneous or parallel operation of the keys assigned to all fingers and to the thumb a large number of states can be defined which allow entry of a plurality of different alphanumeric characters, special signs or processing instructions. By means of an electronic circuitry connected to the keys the states of the keys are interpreted to generate electrical signals which are indicative for the characters or instructions entered.

Furthermore, an ergonomic two-hand keyboard is disclosed by U.S. Pat. No. 5,178,477 of Gambaro. In this keyboard the keys follow a profile which is adapted to the anatomy of the fingers of the user in order to allow operation of the keyboard by only slight gestural finger motions. The keyboard consists of a right-hand part and a left-hand part which are fixedly connected to each other. The fingers have assigned clusters of keys where the keys of each cluster are arranged closely adjacent to each other at different heights and in different angles. Each of the forefingers actuates a cluster of eight different keys which are distributed in two elongate rows. Other fingers have assigned clusters of four keys also distributed in elongate rows. This arrangement permits different regions adjacent a finger tip to actuate different keys, and different regions remote from the finger tip to actuate other keys. The rows are located in close proximity to each other and are arranged to allow for positional adjustment of the rows to adapt the keyboard to hands of different size. Each of the thumbs has assigned a cluster of keys located on a concave ground and actuated by lateral, forward and backward movements of the corresponding thumb within a given cone of motion. Each of both keyboard parts also contains a wrist, hand and palm support which comprises a mount-like portion located close to the finger clusters and a lower portion located close to the thumb cluster. These supports permit a motion free rest of the hands during the operation of the keyboard. Due to the large number of keys in the forefinger and thumb clusters this keyboard requires well-trained operators for an effective use of the keyboard.

SUMMARY OF THE INVENTION

It is an object of the invention to provide an improved keyboard which comprises an ergonomic design by a closer adaptation to the anatomy of an operator's hand and an arrangement of the keys which permits effective use of the keyboard after only a short training period and which permits an operation of the keyboard only by finger movements.

It is a further object of the invention to provide a compact and light weight keyboard which is suitable for use in connection with or as part of mobile devices.

It is also an object of the invention to provide a keyboard which facilitates its use in a blind manner i.e. the keyboard is suitable for being used while the operator concentrates on documents which contain data to be entered into the keyboard. This facilitates the use of the keyboard by blind persons.

According to a further object of the invention a keyboard is provided which may be adapted to be used as one-hand keyboard or as two-hand keyboard.

It is another object of the invention is to provide means which allow an easy adaptation of the keyboard to variations in the size of hands and fingers of different operators.

The keyboard according to the invention includes finger guide means which are formed by adjacent grooves, each of the grooves being arranged to accommodate a finger of an operator's hand. A palm support section is located in front of the grooves and extends over the width of the grooves. A group of keys is sequentially arranged at the ground of the grooves to be reached by the outstretched or bent fingers when the operator's hand rests on the palm support section. Thus, actuation of the keyboard is restricted to finger movements in forward and backward direction while the hand of the operator essentially remains in an unchanged position. A thumb section is preferably located adjacent to a groove assigned to the forefinger of an operator's hand. The thumb section extends to an upright wall of the thumb section adjacent to the forefinger groove.

In one arrangement, at least one of said grooves comprises a cam which is located at the end of the groove adjacent to the palm support section and which is formed to permit holding the device by the tip of the bent finger. This feature permits a mobile use of the keyboard.

The keyboard according to the invention has the advantage that it is better adapted to the anatomy of an operator's hand than conventional flat keyboards. The improved adaptation to the user helps to avoid health problems such as cramps of the hands, backache and tendon inflammations.

BRIEF DESCRIPTION OF THE DRAWINGS

In the following an embodiment of the invention is described with reference to drawings in which.

DETAILED DESCRIPTION OF THE PREFERRED EMBODIMENT

Figure 1:
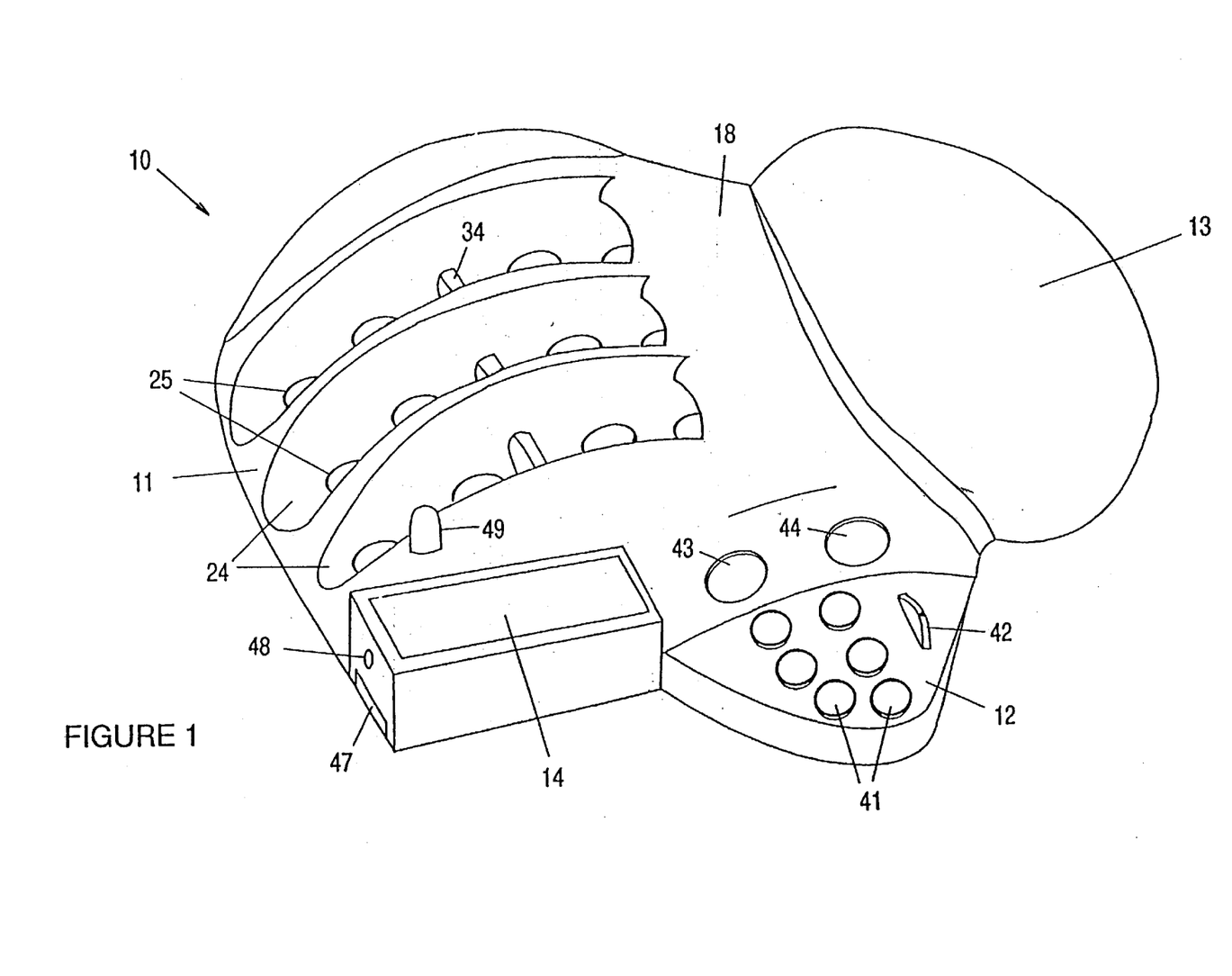
FIG. 1 is a perspective view of an embodiment of the keyboard according to the invention; the keyboard shown being adapted to be used by the right hand.
Figure 2:
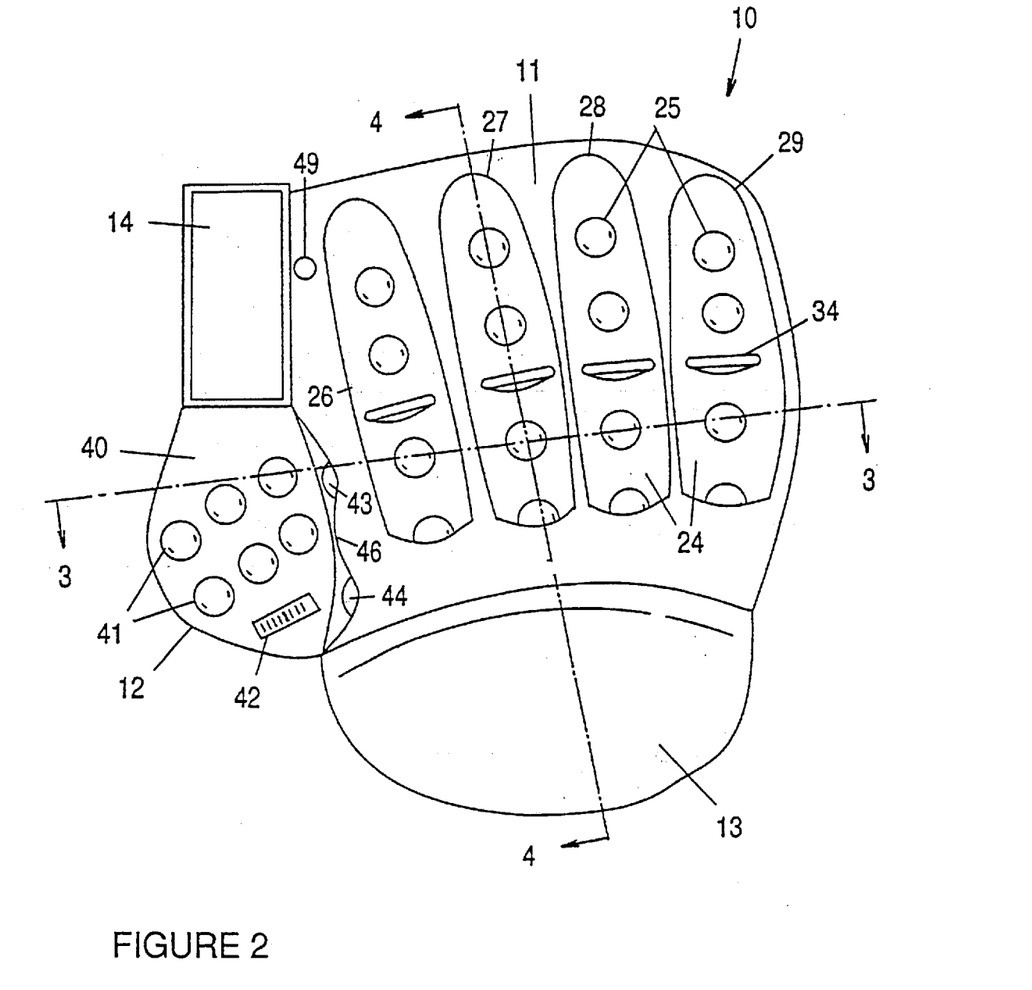
FIG. 2 is a plan view of the keyboard shown in FIG. 1.

FIGS. 1 and 2 show a right-hand module 10 of the keyboard according to the invention. This module comprises a finger section 11, a thumb section 12 and a palm support section 13. The keyboard 10 is also provided with a graphical multipurpose display unit 14 for displaying the characters entered into the keyboard and control information. Keyboard 10 has a sandwich structure comprising a casing part 16, an intermediate part 17 and a cover part 18 as shown in the sectional views of FIGS. 3 and 4. The casing part 16 serves as a housing of circuit components 19 which are used for controlling the operation of the keyboard 10 in a manner which is known per se. The casing part 16 also contains a battery box 20 which is accessible from the bottom to fill in or change batteries 21 which provide the power supply for the operation of the keyboard 10. Furthermore, the casing part 16 carries the thumb section 12 and the display unit 14. The intermediate part 17 surrounds the casing part 16 and forms the finger section 11 jointly with the cover part 18. The cover part 18 also provides the palm support section 13.

Figure 3:
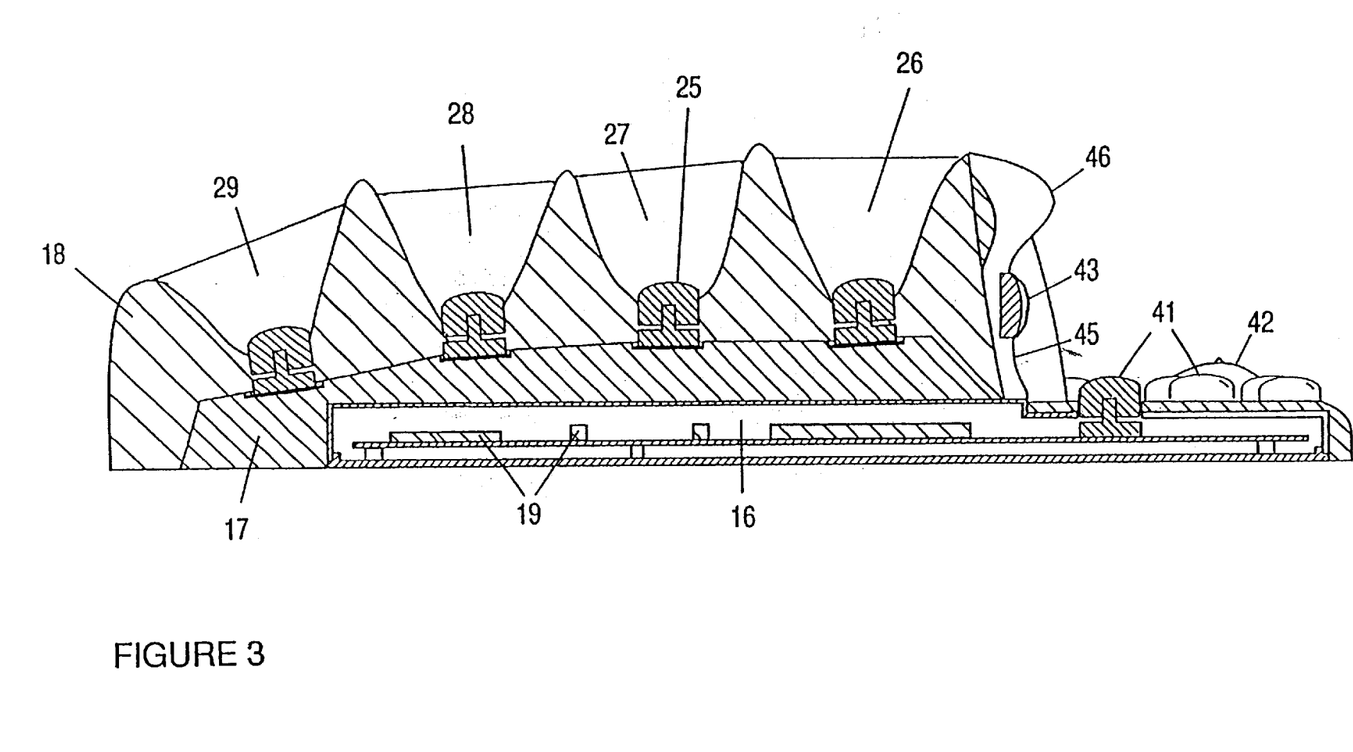
FIG. 3 is a sectional view along line 3—3 in FIG. 2.

The finger section 11 comprises finger grooves 24 with keys 25 arranged therein. The grooves 24 are incorporated in the cover part 18 and located adjacent to each other according to the size of the operator's hand. The profile of each groove 24 is designed to accommodate the fingers of the operator. Groove 26 is assigned to the forefinger, groove 27 is assigned to the middle finger, groove 28 is assigned to the ring-finger and groove 29 is assigned to the little finger. The grooves facilitate access to the keyboard 10 by guiding the fingers of the operator to the correct operational position. The cover plate 18 consists of a plastic material wherein the grooves 26–29 and the palm support section 13 are formed by an injection molding process. FIG. 3 shows a cross section through the cover part 18 to represent the cross profile of grooves 26–29 and the arrangement of the keys 25 within each groove 26–29.

In the implementation shown in FIGS. 1 and 2 each of the grooves 26–29 contains a group of four keys 30, 31, 32, 33 which are arranged in a row in the middle of the corresponding groove 26–29. Each group of keys may be divided by a marker bar 34 in an outer subgroup of two keys 30, 31 and an inner subgroup of two keys 32, 33. The keys 30, 31 of the outer subgroup are actuated by the tips of the outstretched fingers when the hand of the operator rests on the palm support section 13. Accordingly, the keys 32, 33 of the inner subgroup are actuated by the bent fingers. The marker bar 34 assists the fingers tips to operate the correct subgroup. The height of marker bar 34 may be in the range of the height of the keys 31–34 and its distance from the adjacent keys 31, 32 may be the same as the distance between two adjacent keys.

Although in the embodiment represented herein groups of four keys 25 are preferred for each finger, other groupings are within the scope of the invention. For example, each groove 24 may contain a group of six keys 25 which are divided by a marker bar into two subgroups of three keys each. Furthermore, the groups of keys assigned to the various fingers may have different numbers of keys. For example, the groove of the middle finger may have six keys and the groove of the small finger may have four keys only.

Figure 4:
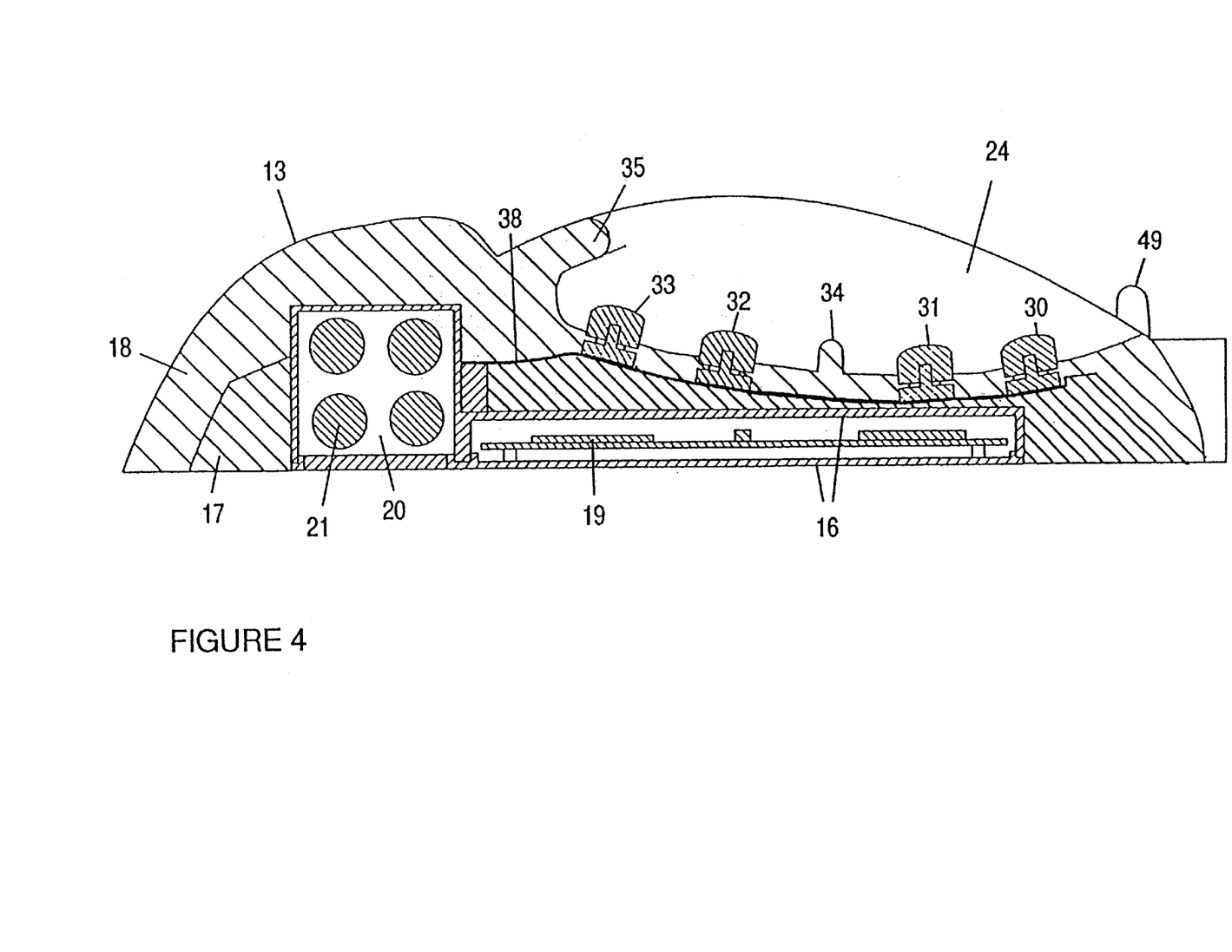
FIG. 4 is a sectional view along line 4—4 in FIG. 2.
Figure 5:
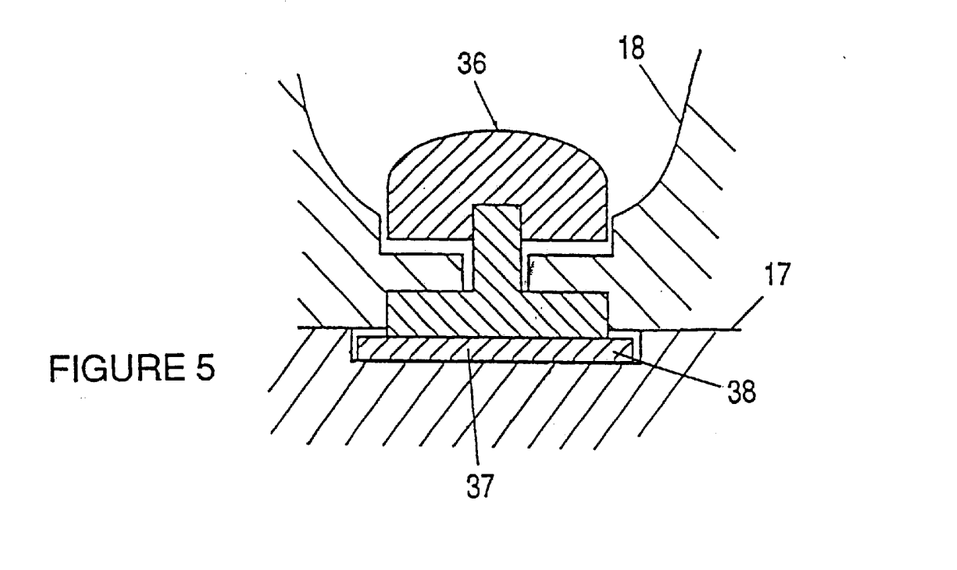
FIG. 5 is an enlarged partial section of a key usable in the keyboard of FIGS. 1 and 2.

Close to the keys 32, 33 of the inner subgroup a cam 35 is provided which forms the end of the corresponding groove 26–29 adjacent to said palm support section 13. The cam 35 serves as a handle to hold the keyboard when the keyboard 10 is moved from one place to another. FIG. 4 shows a length section through the middle finger groove 27 which has a concave floor and is terminated by the cam 35. The keys 31–33 are arranged in holes of the cover part 18 which are located in the floor of groove 27. Each of the keys 30–33 comprises a cap 36 and a base 37 which is fixed on a flexible printed circuit 38 which may consist of a metallized foil shown in an enlarged partial section of FIG. 5. The keys 25 used in the embodiment shown are conventional electrostatic keys which are actuated by finger touching. Instead, known mechanical push button keys may be used.

The thumb section 12 (FIGS. 1 and 2) is arranged adjacent to the inner part of the forefinger groove 26 and comprises a flat field 40 with keys 41. In the embodiment represented herein the flat field 40 comprises six keys 41 arranged in two rows. However, additional keys 41 may be provided such as one or two keys 41 arranged in a third row of keys. The flat field 40 is on a lower level than the keys 25 so that they can be actuated by lateral thumb motions when the hand of the operator rests on the palm support section 13. The keys 41 are command keys such as "enter", "character shift", "space" etc. as will be explained later in more detail. The flat field 40 also includes a thumb operated multi-position switch 42 which may be set to one of four positions to change the assignment of the keys 25 to the characters to be generated when the keys 25 are actuated. Furthermore, the thumb section 12 comprises two keys 43 and 44 located in an upright wall 45 which is arranged adjacent to the forefinger groove 26. Keys 43, 44 allow to enter operational commands as generated by the keys of a conventional input device of the mouse type. For this purpose key 43 corresponds to the left mouse key and key 44 corresponds to the right mouse key. Above the keys 43 and 44 the upright wall 45 adjacent to the forefinger groove 26 comprises a bulge 46 which allows the thumb to support the weight of the keyboard 10 when the user holds the keyboard in his or her hand. The keys 41, 43 and 44 of the thumb section 12 may be of the same type as the keys 25 of the finger section.

Adjacent to the outer part of the forefinger groove 26 and to the thumb section 12 the display unit 14 is arranged which indicates in a manner known per se the data which are entered into the keyboard. Furthermore, the keyboard 10 may be equipped with a bar code scanner 47 for the use in connection with a cash register, and may also be equipped with an infrared communication terminal 48 which allows a wireless communication of the entered data to a personal computer or another data processing system. Instead of terminal 48 a cable may be used to connect the keyboard to data processing or data communication devices. The scanner 47 and the terminal 48 are provided at the front wall of the display unit 14 (FIG. 1).

Between the finger section 11 and the display unit 14, keyboard 10 comprises a display cursor actuation stick 49 which is well known per se to replace a conventional input device of the mouse type and which is also called mouse stick or track point. The cursor actuation stick 49 is arranged in the cover part 18 close to the outer end of the forefinger groove 26 and may be operated by the tip of the forefinger jointly with the actuation of the mouse keys 43, 44 by the thumb of the user.

Figure 6:
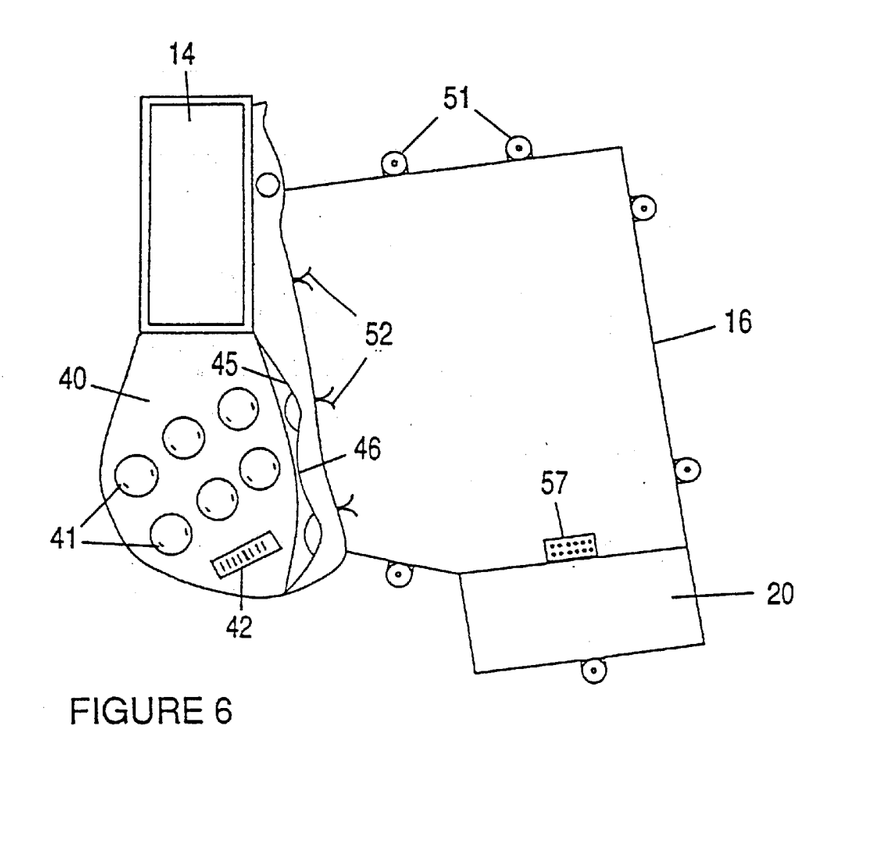
FIG. 6 is a plan view of a casing part contained in the keyboard of FIGS. 1 and 2.
Figure 7:
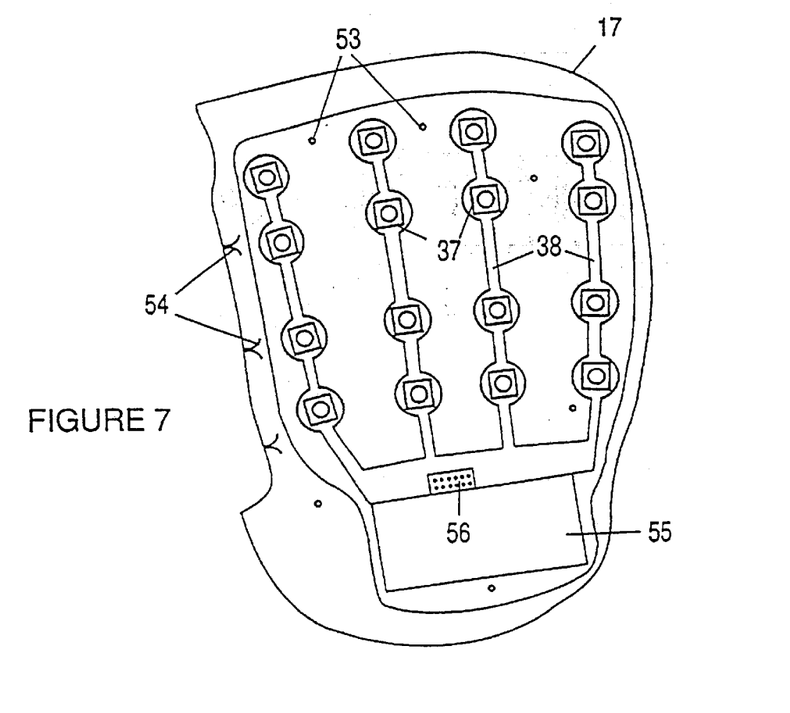
FIG. 7 is a plan view of an intermediate part contained in the keyboard of FIGS. 1 and 2.
Figure 8:
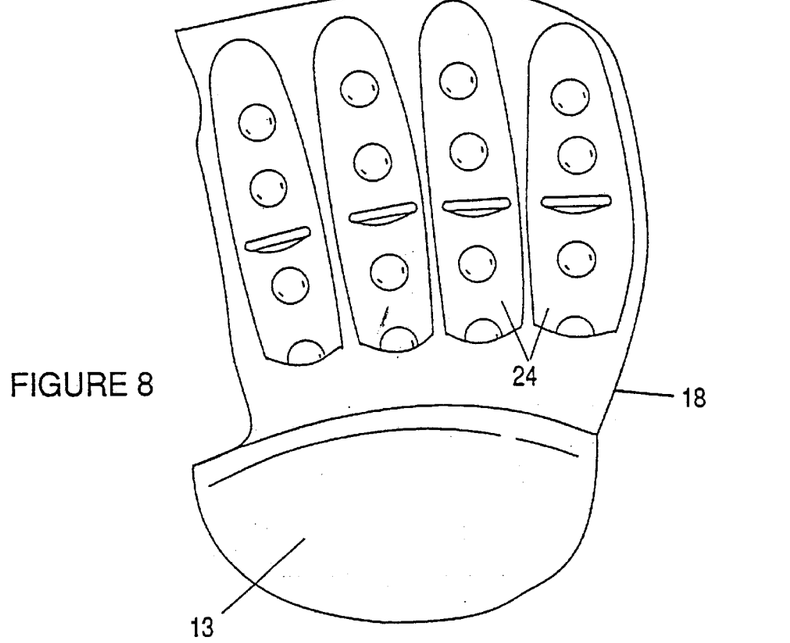
FIG. 8 is a plan view of a cover part contained in the keyboard of FIGS. 1 and 2.

FIGS. 6–8 show views of the casing part 16, the intermediate part 17 and the cover part 18 in separate representations. FIG. 6 shows a plan view of the casing part 16 which comprises the housing 50 of the circuit components 19 and the battery box 20. The display unit 14, the flat field 40 and the upright wall 45 are connected to the casing part 16. Fastening extensions 51 serve by means of screws for connecting the intermediate part 17 and the cover part 18 to the casing part 16. The fastening of parts 17 and 18 to the casing part 16 is supported by upright guide rails 52 which are provided at a side wall of the casing part 16.

FIG. 7 shows a plan view of the intermediate part 17 which has holes 54 located according to the fastening extensions 51. The intermediate part 17 also comprises guide rails 54 which engage the guide rails 52 of the casing part 16. Furthermore, the intermediate part 17 comprises a recess 54 wherein the flexible printed circuit 38 is inserted which carries the base parts 37 of the keys 25 where the base parts 37 are soldered to the metal surface layer of the flexible printed circuit 38. The form of the foil 38 corresponds to the positions of the keys 25 in the grooves 26–29 of the cover part 18. The intermediate part 17 contains a rectangular aperture 55 into which the upper portion of the battery box 20 extends, and a multi-point plug 56 which is brought into contact with a corresponding connector 57 of the casing part 16.

FIG. 8 shows a plan view of cover part 18 with the grooves 26–29 and the palm support section 13 which is broad enough to extend across the width of all the grooves 26–29. The cover part 18 is fixed to the intermediate part 17 and the casing part 16 by means of screws which extent from the fasteningextensions 51 via the holes 53 into corresponding thread holes in the cover part 18.

The cover part 18 shown in FIG. 8 is adapted to an average hand size. Cover parts 18 of different sizes may be provided to adapt the keyboard 10 to the size of the hands of different groups of users. Accordingly, with each of said different cover parts 18 a correspondingly adapted intermediate part 17 has to be used while the casing part 16 remains the same for all sizes of the parts 17 and 18. The different cover parts 18 may deviate from each other by the distance which the grooves 26–29 have from each other, and by the profile, width and length of the grooves 26–29.

Figure 9A:
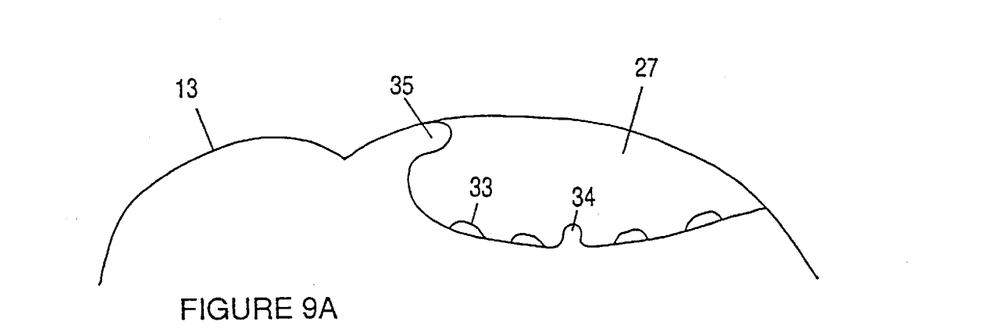
FIGS. 9A–9D are schematic representations of the various length profiles of the grooves as they may be used in the keyboard of FIGS. 1 and 2.
Figure 9B:
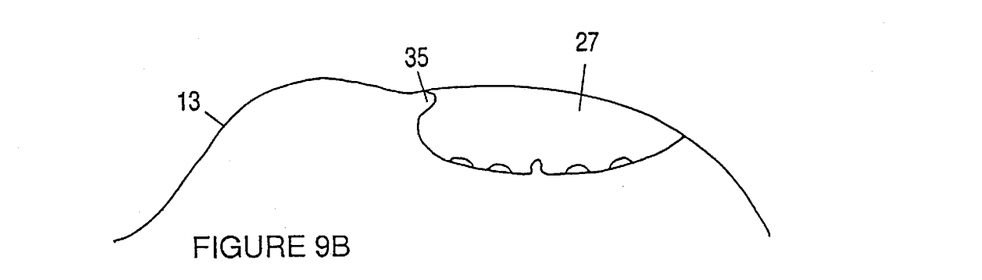
Figure 9C:
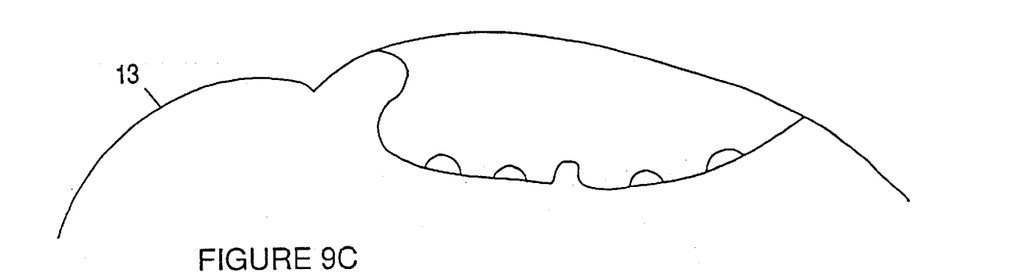
Figure 9D:
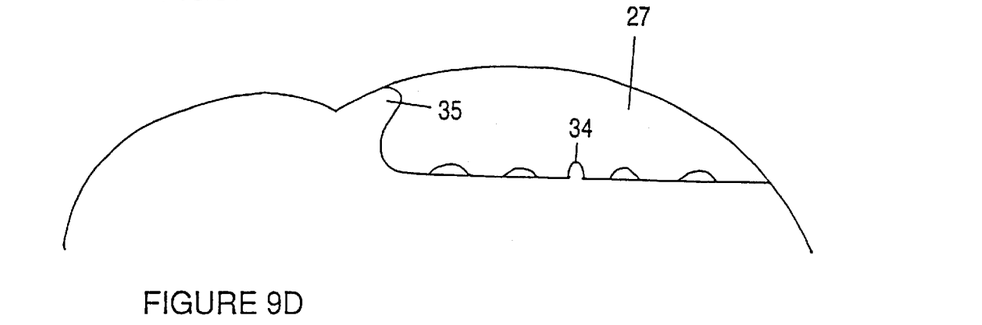

FIGS. 9A–9D show schematic sectional views of various profiles of the grooves where the groove 27 assigned to the middle finger is considered to be representative also for the grooves 26, 28, 29 assigned to the other fingers. FIG. 9A shows a profile which is adapted to a hand and fingers of normal size. In this profile the floor of the groove 27 is concave and is sharply curved at its inner end to form the cam 35 which reaches close to the area over the inner key 33. FIG. 9B shows a profile which is adapted to a hand having short fingers. This profile is also concave but has a cam 35 of a smaller size. FIG. 9C shows a profile which is adapted to a hand having long fingers where its overall form is similar to the profile shown in FIG. 9A. The profile shown in FIG. 9D has a flat floor which may be preferred by persons who are used to work with flat keyboards.

Figure 10:
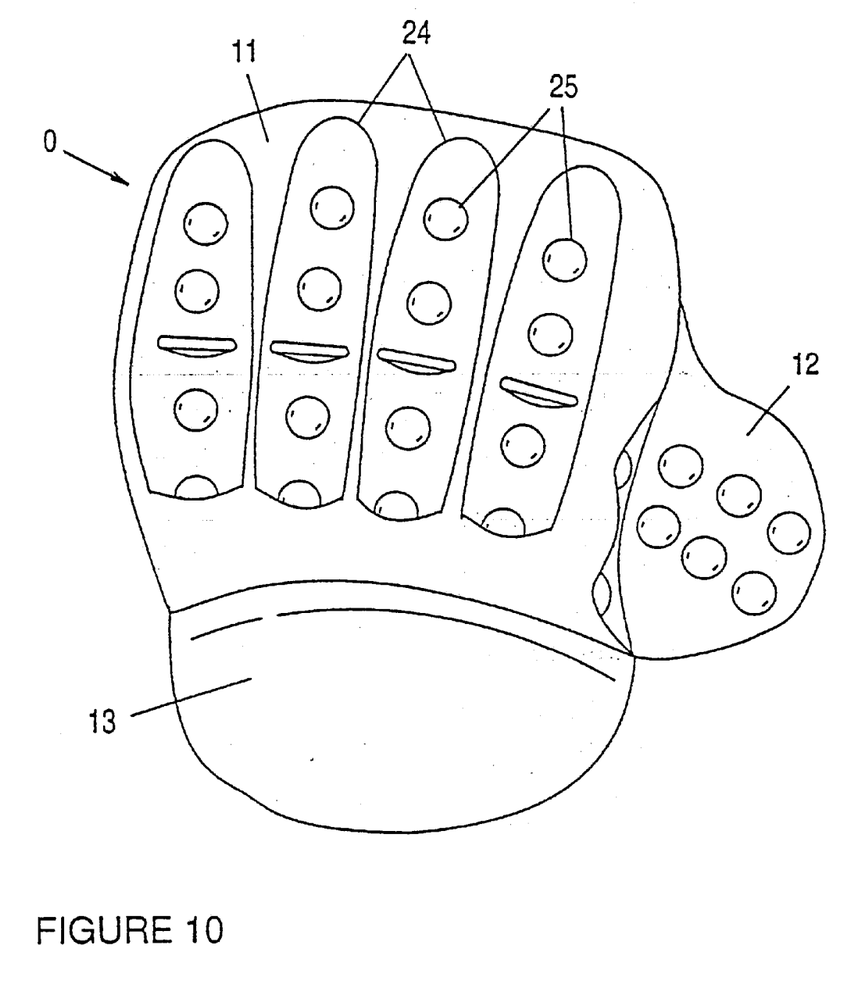
FIG. 10 is a plan view of a left-hand module of the keyboard according to an embodiment of the invention.

While FIGS. 1–7 show the right-hand module of the keyboard 10, FIG. 10 shows a plan view of the left-hand module 60 of the keyboard according to the invention. The left-hand module 60 is essentially a mirror like implementation of the right-hand module except that it does not contain a display unit and a cursor actuation stick.

Figure 11:
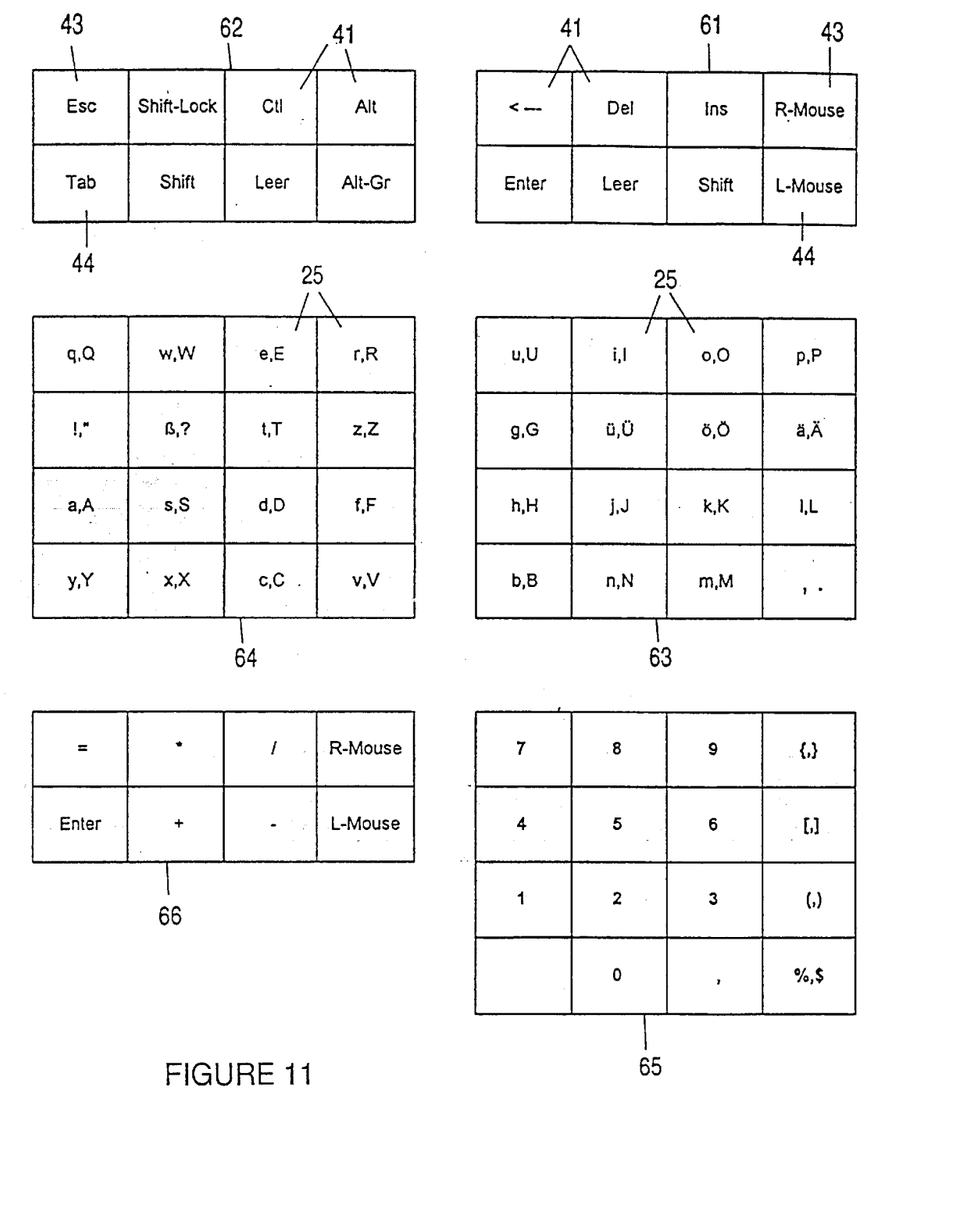
FIG. 11 shows two examples of the assignment of the keys to the characters which are generated by actuating the keyboard of FIGS. 1, 2 and 10.

FIG. 11 shows the alphanumerical characters, special signs and commands which are generated when the keys 25, 41, 43 and 44 of the right-hand module and the left-hand module of the keyboard 10 are actuated. Field 61 indicates the commands generated by actuation of the keys 41, 43 and 44 in the thumb section 12 of the right-hand module. Accordingly, field 62 shows the meaning of the corresponding keys in the left-hand module. It should be mentioned that the keys 43 and 44 which serve in the right-hand module as mouse keys are assigned in the left-hand module to the commands "Esc" and "Tab". The assignment of the keys 25 to the alphabetical characters is shown in the field 63 of the right-hand module 10 and in the field 64 of the left-hand module 60. Additional characters and special signs may be generated by increasing the number of keys 25, for example, by providing at least in some of the grooves 26–29 groups of more than four keys. Although the assignments depicted in FIG. 11 are designed for use with the German language, it will be understood that the invention encompasses other key assignments for use with other languages.

For use of the module 10 as a one-hand keyboard to enter numerical information only the assignment of the keys 25 is as indicated in field 65 and the assignment of the keys 41, 43 and 44 is indicated in field 66. These assignments are in particular suitable for the use of the keyboard as mobile keyboard. Two additional sets of key assignments can be selected by actuation of the multi-position switch 42. These additional assignments may be defined according to the purpose for which the keyboard is used. The correct generation of the electrical signals representing the alphanumerical characters, special signs and commands is performed in a known manner by the electronic circuits 19.

Figure 12:
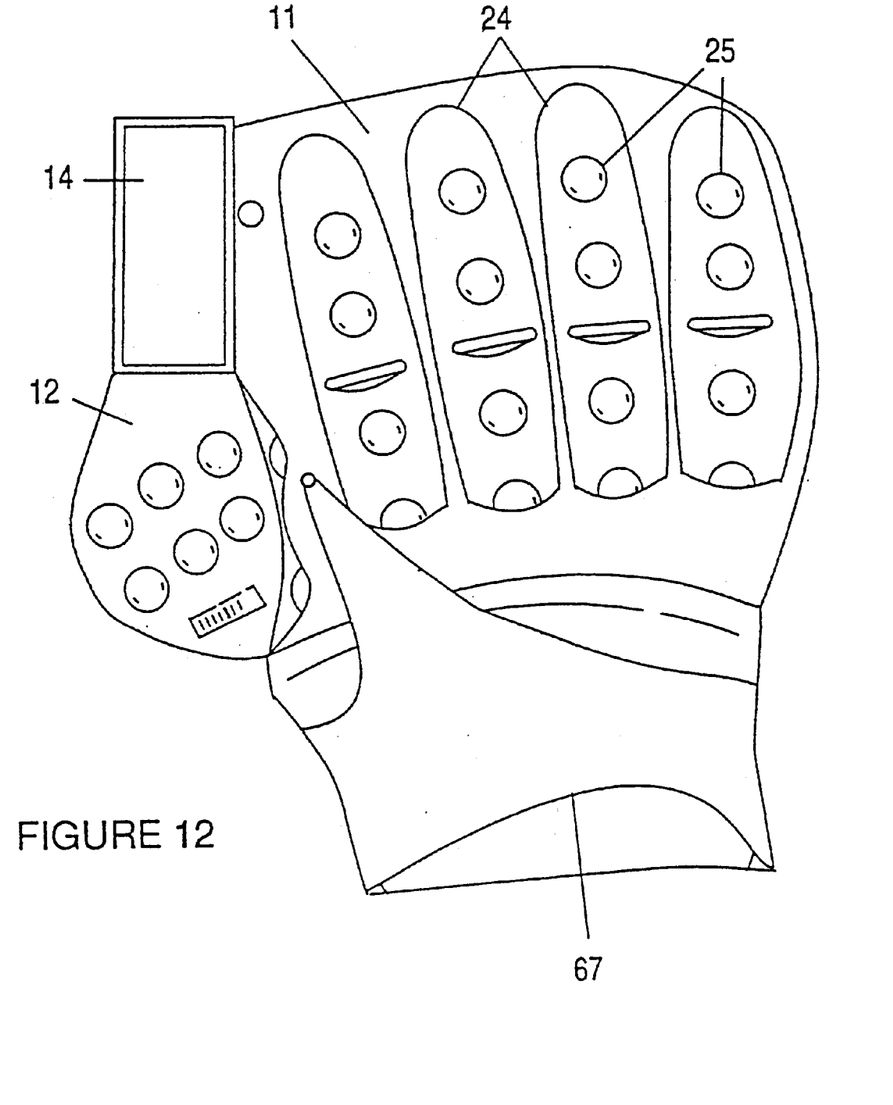
FIG. 12 is a plan view of a modification by which the keyboard of FIGS. 1 and 2 may be used as hand-held keyboard.

FIG. 12 relates to a modification of keyboard 10 to facilitate the use of the keyboard 10 as mobile one-hand keyboard by providing a cuff 67 which is fixed to both sides of the keyboard 10 in the area above the palm support section 13. The user of the keyboard puts his right hand into the cuff 65 when he starts using the keyboard 10 so that the cuff 67 surrounds the wrist of the user. The cuff 67 then secures the keyboard 10 at the hand of the user also when the user moves the hand or walks around.

While the invention is described with reference to a preferred embodiment, modifications or other implementations of the invention are within the scope of the invention as defined in the claims.

What is claimed is:

1. A keyboard device for hand input of data to an information processing system, including:
    a finger section including a plurality of grooves separated by finger guide portions, each of said grooves being arranged to accommodate a finger of an operator's hand and housing a plurality of keys;
    a thumb section including a group of keys arranged to be operated by a thumb of the operator's hand; and a palm support section located in front of said grooves and extending across the width of said grooves;

wherein the plurality of keys is sequentially arranged in each of said grooves so as to be reachable by the outstretched or bent finger when the operator's hand is in contact with the palm support section and wherein at least one of said grooves includes a cam located at the end of the groove adjacent to said palm support section and formed to permit holding the keyboard device by a finger tip.

2. A keyboard device for hand input of data to an information processing system, including:

a finger section including a plurality of grooves separated by finger guide portions, each of said grooves being arranged to accommodate a finger of an operator's hand and housing a plurality of keys;

a thumb section including a group of keys arranged to be operated by a thumb of the operator's hand; and a palm support section located in front of said grooves and extending across the width of said grooves;

wherein the plurality of keys is sequentially arranged in each of said grooves so as to be reachable by the outstretched or bent finger when the operator's hand is in contact with the palm support section, and wherein each of said grooves includes a marker bar which divides the plurality of keys into an outer group operable by the stretched or slightly bent finger and an inner group operable by the finger tips of the bent fingers, the marker bar being located between said inner and outer groups of keys and has the same height as the keys, and wherein each plurality of keys comprises four keys with each of said inner and outer groups comprising two keys.

3. The keyboard device of claim 2, wherein said thumb section is located close to a forefinger groove and extends to an upright wall of the thumb section adjacent to the forefinger groove.

4. The keyboard device of claim 3, wherein said thumb section includes a flat area including two rows of keys, and further includes two keys disposed in the upright wall.

5. The keyboard device of claim 4, wherein the keys in said flat area are command keys and the keys in the upright wall have the function of left and right mouse keys.

6. The keyboard device of claim 2, wherein said grooves each have a length approximately equal to the length of a corresponding finger.

7. The keyboard device of claim 2, further including a graphical multipurpose display unit arranged adjacent to a forefinger groove and said thumb section.

8. The keyboard device of claim 2, further including a cursor actuation stick arranged adjacent to a forefinger groove and said thumb section.

9. The keyboard device of claim 2, wherein said thumb section includes a multi-position switch for selecting one of different key-to-character/command and key-to-command assignments.

10. The keyboard device of claim 2, further including a cuff fixed to said keyboard device in an area above said palm support section, said cuff being arranged to accommodate an operator's wrist for securing the keyboard device to a hand of the operator.

11. The keyboard device of claim 7, further including a bar code scanner arranged at a front side of the graphical multipurpose display unit.

12. A keyboard device for hand input to an information processing system, including:

a finger section including a plurality of grooves separated by finger guide portions, each of said grooves being arranged to accommodate a finger of an operator's hand and housing a plurality of keys;

a thumb section including a group of keys arranged to be operated by a thumb of the operator's hand;

a casing in which is housed control circuit components operable to generate signals indicative of the actuated key;

an exchangeable cover connected to said casing and containing said grooves; and a palm support section located in front of said grooves and extending across the width of said grooves;

wherein the plurality of keys is sequentially arranged in each of said grooves so as to be reachable by the outstretched or bent finger when the operator's hand is in contact with the palm support section.

13. The keyboard device of claim 12, wherein said cover Is one of a plurality of different sizes of cover adapted to the hand size of the operator.

14. The keyboard device of claim 13, further including an intermediate part which is arranged between said casing and said cover for carrying base portions of said keys; said intermediate part being exchangeably connected to said casing and adapted to the size of said cover.

15. Apparatus comprising:

a finger section including a plurality of grooves separated by finger guide portions, each of said grooves being arranged to accommodate a finger of an operator's hand and housing a plurality of keys;

a thumb section including a group of keys arranged to be operated by a thumb of the operator's hand; and a palm support section located in front of said grooves and extending across the width of said grooves;

wherein the plurality of keys is sequentially arranged in each of said grooves so as to be reachable by the outstretched or bent finger when the operators hand is in contact with the palm support section, and wherein each of said grooves includes a marker bar which divides the plurality of keys into an outer group operable by the stretched or slightly bent finger and an inner group operable by the finger tips of the bent fingers, the marker bar being located between said inner and outer groups of keys and has the same general height as the keys, and wherein each plurality of keys comprises four keys with each of said inner and outer groups comprising two keys.

* * * * *